United States Patent
Kerner et al.

[11] Patent Number: 5,752,742
[45] Date of Patent: May 19, 1998

[54] HEADREST FOR A VEHICLE SEAT

[75] Inventors: Wolfgang Kerner, Bondorf; Dietmar Zwölfer, Hildrizhausen, both of Germany

[73] Assignee: Mercedes-Benz AG, Stuttgart, Germany

[21] Appl. No.: 681,390

[22] Filed: Jul. 23, 1996

[30] Foreign Application Priority Data

Aug. 3, 1995 [DE] Germany ............... 195 28 716.9

[51] Int. Cl.$^6$ ............................................. A47C 7/36
[52] U.S. Cl. ............................................. 297/391; 297/406
[58] Field of Search ................................. 297/391, 406, 297/407, 464

[56] References Cited

U.S. PATENT DOCUMENTS

| | | | |
|---|---|---|---|
| 4,205,878 | 6/1980 | Wooten | 297/391 |
| 4,762,367 | 8/1988 | Denton | 297/391 X |
| 5,161,855 | 11/1992 | Harmon | 297/391 X |
| 5,411,468 | 5/1995 | Chen | 297/391 X |
| 5,443,303 | 8/1995 | Bauer et al. | 297/391 X |
| 5,513,897 | 5/1996 | Lemmen | 297/391 X |

FOREIGN PATENT DOCUMENTS

| | | | |
|---|---|---|---|
| 0065644 | 12/1982 | European Pat. Off. | 297/391 |
| 8810569 U | 2/1989 | Germany . | |
| 94/02139 | 4/1995 | United Kingdom . | |
| WO95/09742 | 4/1995 | WIPO . | |

Primary Examiner—Peter M. Cuomo
Assistant Examiner—Stephen Vu
Attorney, Agent, or Firm—Evenson, McKeown, Edwards & Lenahan, P.L.L.C.

[57] ABSTRACT

A headrest for a vehicle seat having a backrest is provided which has a head cushion fastened to two supporting rods and two side pieces which are integrated in the head cushion. In the in-use position, the side pieces project laterally on the head cushion beyond its cushion front and, in the not-in-use position are accommodated inside the contour of the head cushion. For implementing a headrest of a compact minimum size and an aesthetically attractive shape which optimally meets the demands made on a headrest with respect to the driving operation and the resting phase, each side piece is swivellably disposed on a vertical tube section which, in turn, is fastened on a supporting rod so that it can be swivelled about a swivel shaft extending transversely thereto. Using an upper and lower cross traverse, the two tube sections are fixedly connected with one another and each carry a cushion enlargement of the head cushion. The side pieces are constructed in such a manner using a parallelepiped-shaped basic cushion body and a padded wedge piece continuing therefrom in one piece that, in their not-in-use position, they cover one another and end flush with the front and rear side of the cushion enlargements.

20 Claims, 3 Drawing Sheets

HEADREST FOR A VEHICLE SEAT

BACKGROUND AND SUMMARY OF THE INVENTION

This invention relates to a headrest for a vehicle seat having a backrest, having a head cushion fastened on two supporting rods for the holding in the backrest and having two side pieces which are assigned to the head cushion and which, in the in-use position, protrude laterally on the head cushion beyond its cushion front and, in the not-in-use position, are accommodated within the contour of the head cushion.

Side pieces on such headrests are used for preventing the vehicle occupant's head from slipping off the headrest while he is resting or sleeping. During the drive, these side pieces interfere with the driver's view to the side and to the rear and, when not in use, are therefore placed inside the contours of the head cushion.

In the case of a known headrest of this type (German Patent Document DE 88 10 569 U1), the side pieces are held on vertical shafts, which are fastened on the supporting rods, and, for the change into their unused position, are swivelled by 90° to the outside and are pushed into the head cushion from the side. Since a head cushion which is too large restricts the observation of the rearward and lateral road traffic, the head cushion size is limited to a compact minimum size in the case of today's headrests. This makes it necessary that, in the case of the known headrest, the two side pieces, viewed in the depth of the head cushion, be placed behind one another which has the result that the head cushion clearly becomes thicker than the backrest of the vehicle seat. However, for reasons of appearance such a head cushion thickness is unacceptable. In addition, viewed in the direction of the head cushion depth, the swivel shafts of the side pieces must be arranged to be offset with respect to one another so that, for compensating this offsetting of the swivel shafts, one side piece must be longer than the other. This also results in unpleasant effects on the harmonious appearance of the headrest. The parallel insertion of the side pieces also considerably limits the freedom with respect to the constructive design of the tiltability of the headrest about a tilting axis extending transversely to the supporting rods or even makes it necessary to eliminate such tiltability. The inclining of the headrest about a tilting axis extending in the so-called y-axis of the vehicle, however, is absolutely necessary so that the headrest can be optimally adapted to the physiognomy of the back part of the vehicle occupant's head.

It is an object of the invention to provide a headrest of the initially mentioned type of a compact minimum size and a shape with an attractive appearance which optimally combines the demands of the driving operation made on the headrest with those of the resting phase in a low-cost manner.

In the case of a headrest of the type referred to above, this object is achieved according to preferred embodiments of the invention by an arrangement wherein each side piece is swivellably disposed on a vertical tube section which, in turn, is fastened on a supporting rod to be swivellable about a swivel shaft extending transversely thereto, wherein the two vertical tube sections, which are in each case assigned to one side piece, are fixedly connected with one another by way of an upper and a lower cross traverse, which each carry an upper and a lower cushion enlargement of the head cushion, and wherein the side pieces each have a parallelepiped-shaped basic cushion body respectively situated between the cushion enlargements, which basic body has a depth which corresponds to the depth of the cushion enlargements, and has a padded wedge piece continuing therefrom in one piece, and wherein the wedge pieces are constructed such that, in the not-in-use position of the side pieces, they cover one another at least partially between the cushion enlargements and end approximately flush with the front and rear side of the cushion enlargements.

The headrest according to the invention has the advantage that it has a compact minimal size during the driving operation and thereby permits a sufficient freedom of view for the driver to the rear and the side and offers side pieces which can be swivelled out for the resting phase and which prevent the vehicle occupant's head from slipping off the head cushion while he is asleep and that the headrest can be tilted about a swivel shaft which is aligned transversely with respect to the supporting rods and can thus be adapted to the physiognomy of the back of the vehicle occupant's head. The swivelling inclining mechanism of the headrest according to the invention requires only a low depth so that, despite a cushioning which is extensive for safety reasons, the headrest can be adapted to the depth of the backrest without any problems and, as a result, in the in-use position as well as in the not-in-use position of the side pieces, has an aesthetic shape and forms a harmonious unity with the backrest. The swivel shafts for the side pieces are situated in the center with respect to the head cushion depth and can be swivelled in and out rapidly and comfortably. Because of the constructively possible, relatively large length of the side pieces, a driving in the folded-out condition of the side pieces is not possible and therefore necessarily relieves the driver from the decision as to whether he should retract the side pieces for the driving. A self-endangering of unreasonable drivers is therefore excluded from the start. The headrest is easy to mount and demount so that it can be manufactured and disposed of in a low-cost manner. During the disposal, the different materials can be separated according to their types without any additional expenditures.

Other objects, advantages and novel features of the present invention will become apparent from the following detailed description of the invention when considered in conjunction with the accompanying drawings.

DETAILED DESCRIPTION OF THE DRAWINGS

Figure 1:
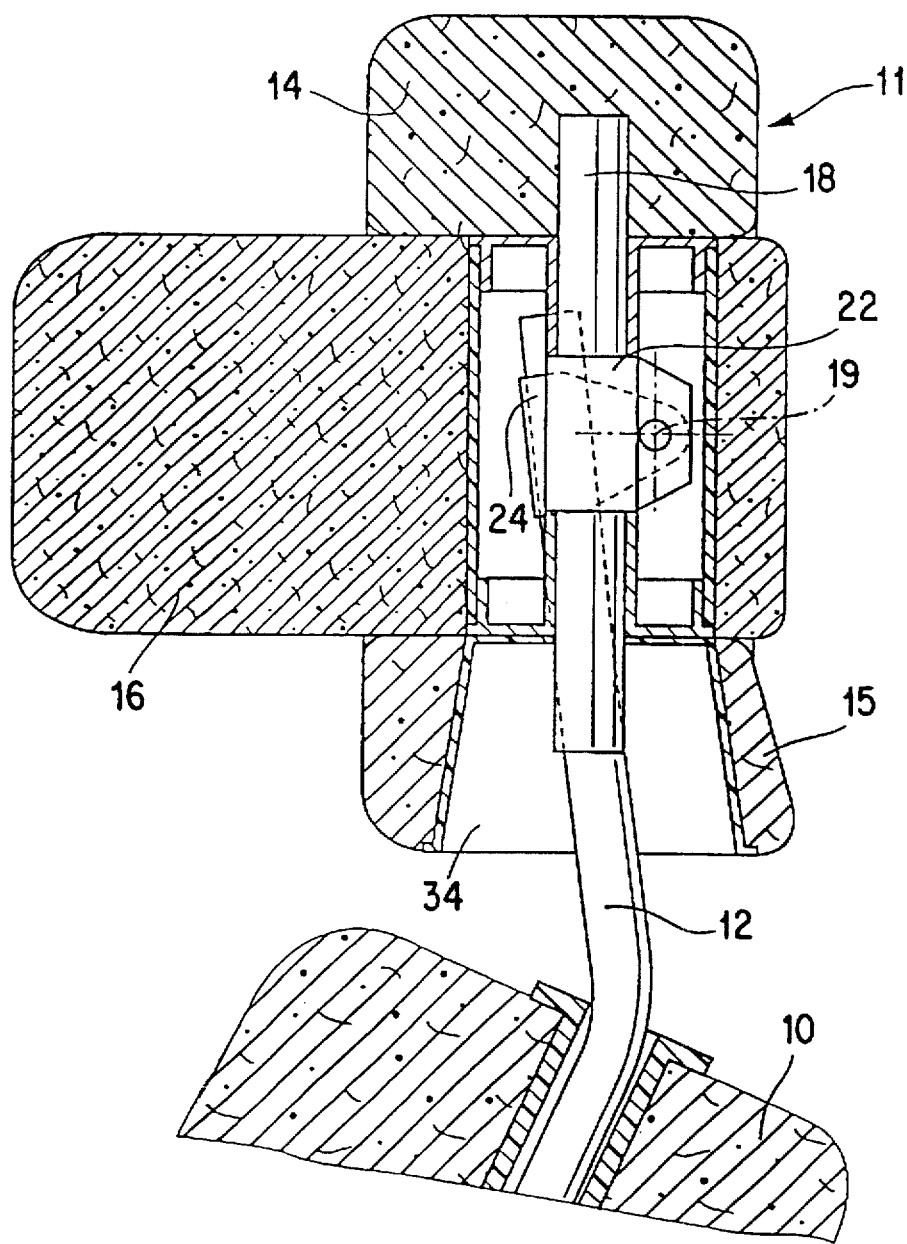
FIG. 1 is a partially sectional, lateral view of a headrest constructed according to a preferred embodiment of the invention and connected with a backrest of a vehicle seat.
Figure 2:
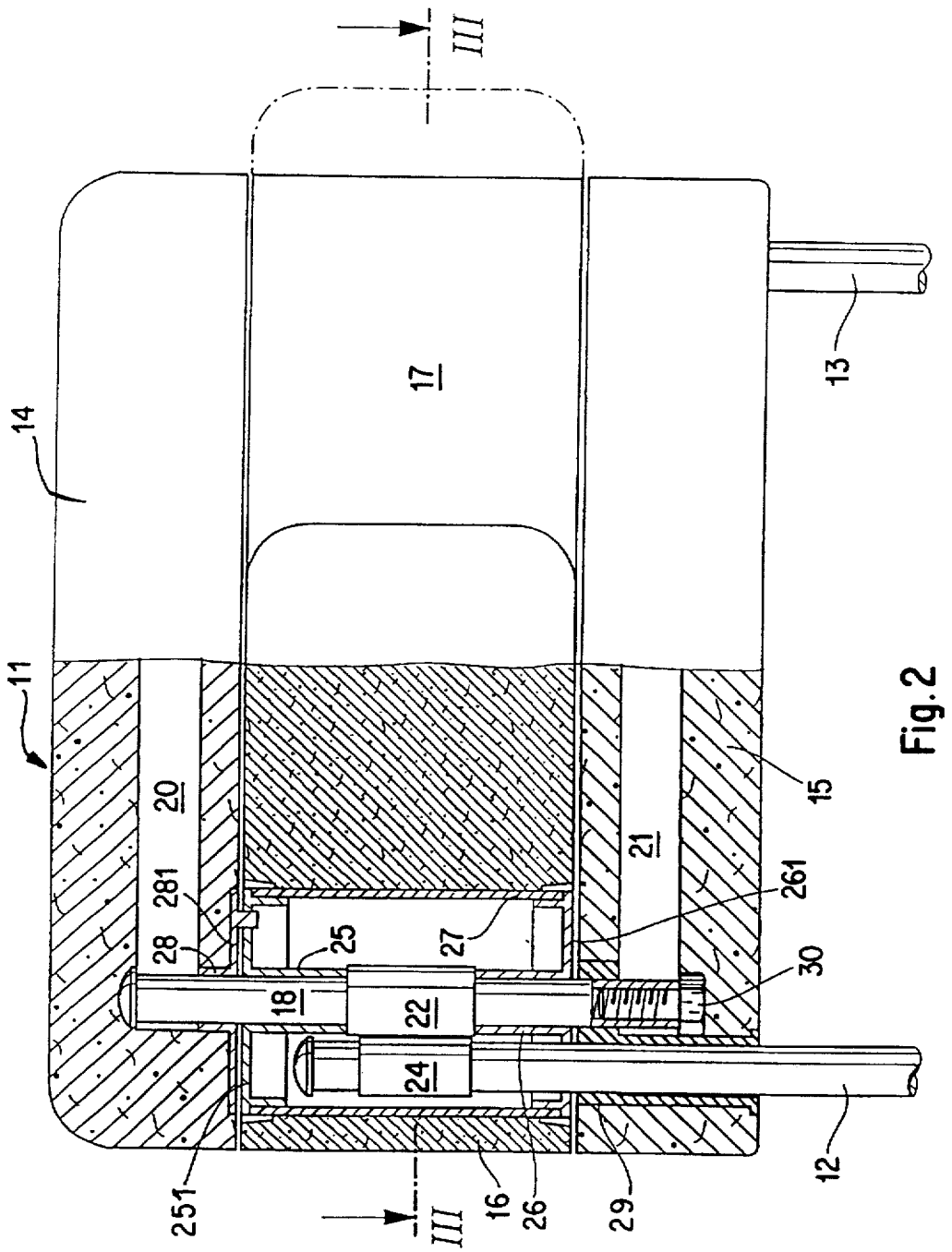
FIG. 2 is a partially sectional, frontal view of the headrest in FIG. 1.

The headrest for a vehicle seat with a backrest 10 illustrated in a lateral view in FIG. 1 and in a frontal view in FIG. 2 has a head cushion 11 which is fastened on two supporting rods 12, 13 extending at a transverse distance from one another. The supporting rods 12, 13 are used for the holding of the headrest in the backrest 10 and are guided in it in a vertically adjustable manner. The head cushion 11 is composed of an upper and a lower cushion enlargement 14, 15 and two padded side pieces 16, 17 situated in between.

The vertical height of the side pieces 16, 17 is slightly smaller than the distance between the upper and the lower cushion enlargement 14, 15 and approximately half as large as the head cushion height. In the retracted condition, the side pieces 16, 17 are accommodated within the contour of the head cushion 11 and end on the rear side and on the front side of the head cushion 11 approximately flush with the two cushion enlargements 14, 15.

The two side pieces 16, 17 have identical constructions and each have a parallelepiped-shaped basic cushion body 161 and 171 and a padded wedge piece 162 and 172 continuing therefrom in one piece. The wedge pieces 162, 172 are constructed such that, in the not-in-use position of the side pieces 16, 17, in which these are situated within the contour of the head cushion, they at least partially cover one another and end approximately flush with the front and rear side of the cushion enlargements 14, 15. The sectional representation of FIG. 3 best shows the construction of the side pieces 16, 17 and their arrangement in the not-in-use position. The rear side of the lower cushion enlargement 15 has the reference number 151 and its front side has the reference number 152.

For changing the side pieces 16, 17 into their in-use position illustrated by a broken line in FIG. 3, a swivel mechanism is provided which has an identical construction for both side pieces 16, 17 so that in the following only the swivel mechanism for side piece 16 will be described.

Figure 3:
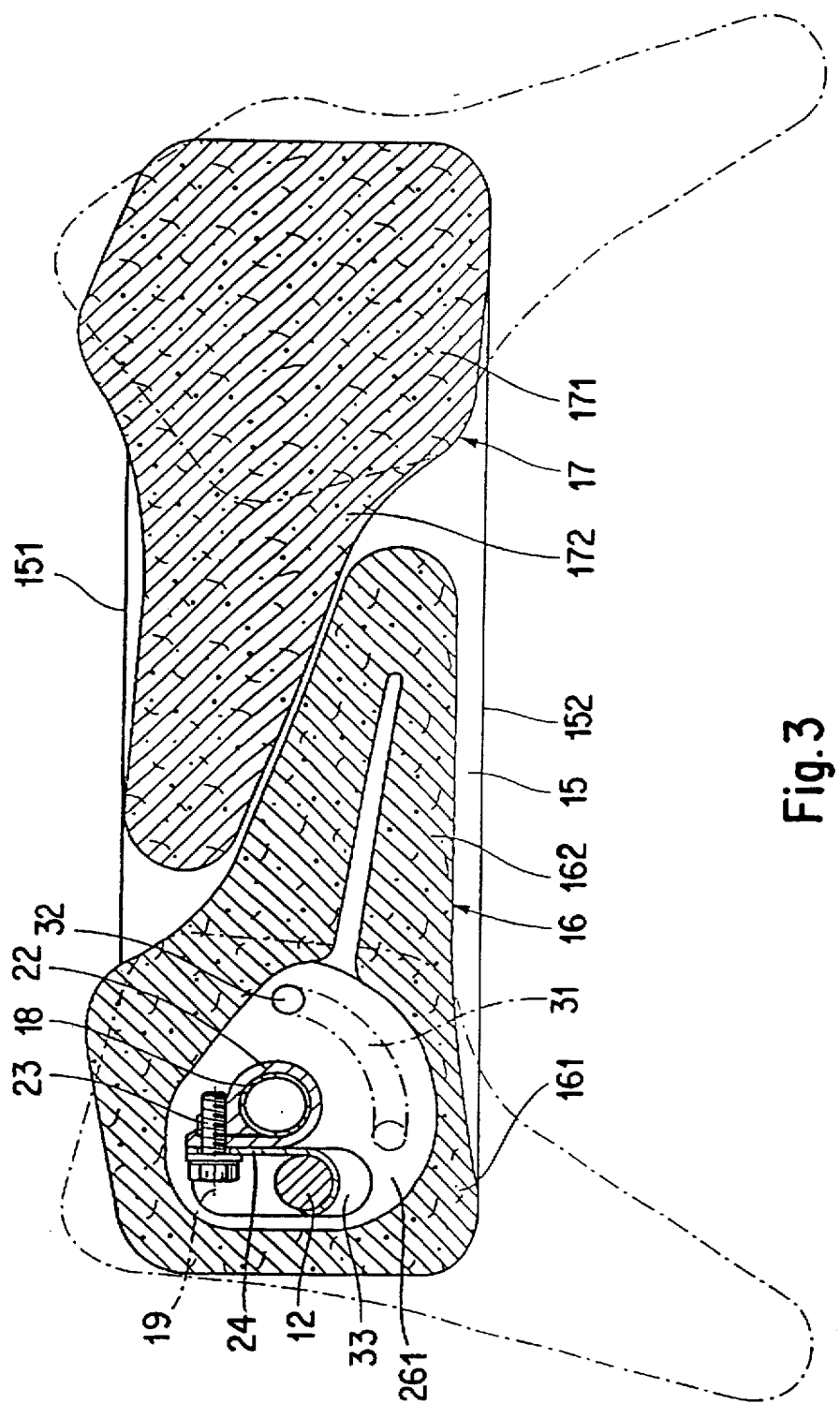
FIG. 3 is a cross-sectional view of the headrest according to Line III—III in FIG. 2.

As illustrated in FIGS. 2 and 3, the side piece 16—as the side piece 17—is swivellably disposed on a vertical tube section 18 which, in turn, is fastened on a supporting rod 12 or 13 to be swivellable about a swivel shaft 19 extending transversely thereto. The two vertical tube sections 18 are fixedly connected with one another by way of an upper cross traverse 20 and a lower cross traverse 21 so that a frame-type supporting structure for the cushion enlargements 14, 15 and the side pieces 16, 17 is obtained which can be tilted about the transversely extending swivel shaft 19 relative to the supporting rods 12, 13, whereby, the headrest can be adapted in its inclination to the physiognomy of the back of the vehicle occupant's head. The upper cushion enlargement 14 is clipped onto the upper cross traverse 20 and the lower cushion enlargement 15 is clipped onto the lower cross traverse 21. The clip connection has the advantage that, during the demounting of the headrest, the cushion enlargements 14, 15 can easily be separated from the supporting frame.

For the swivel bearing of the side piece 16 and 17 on the tube section 18, a clamping hub 22 is arranged in the center on the tube section and is fastened by means of a clamping and locking screw 23 in a swivellable manner on a supporting arm 24 welded to the supporting rod 12. The shaft of the clamping and locking screw 23 is aligned with the swivel shaft 19. Above and below the clamping hub 22, an upper bearing bush 25 and a lower bearing bush 26 are arranged on the tube section 18 and together carry in a non-rotatable manner a hollow cylinder 27 surrounding the tube section 18 and the supporting rod 12. In this case, the hollow cylinder 27 is held between disk-shaped covers 251, 261 which close off the two faces of the hollow cylinders 27 and are, in each case, molded in one piece to the bearing bushes 25, 26. The basic body 161 of the side piece 16 is non-rotatably disposed on the hollow cylinder 27, for the purpose of which this hollow cylinder 27 is equipped with a paddle-type ribbing. The bearing bushes 25, 26 extend to the clamping hub 22 and are supported on it against a vertical displacement.

The upper cross traverse 20 and the lower cross traverse 21 are pushed by means of end-side eye rings onto the tube sections 18 and are fastened thereon. Between the upper cross traverse 20 and the upper bearing bush 25, a distance piece 28 is arranged with a molded-on bearing disk 281, and, between the lower bearing bush 26 and the lower cross traverse 21, a distance ring 29 is placed onto the tube section 16. The lower cross traverse 21 is held by a screw 30 which is screwed into an internal thread cut in at the end of the tube section 18. As illustrated particularly in FIG. 2, a pin-slot guide is provided between the upper bearing bush 25 and the distance piece 28 with the bearing disk 281 and is used for forming a swivel stop for the side piece 16. For this purpose, a curved-segment-shaped slot 31 (FIG. 3) which is concentric to the tube section 18 is placed in the cover 251 of the upper bearing bush 25, and on the bearing disk 281 of the distance piece 28, a pin 32 is arranged which projects into the slot 31. The slot length is dimensioned such that, in the not-in-use position of the side piece 16, the pin 32 strikes against one end and, in the in-use position of the side piece 16 (indicated by a broken line in FIG. 3), strikes against the other end of the slot 31.

In order to ensure the tiltability of the head cushion 11 about its swivel shaft 19, a longitudinal recess 33 (FIG. 3) is provided in the cover 261 of the lower bearing bush 26, which longitudinal recess 33 (FIG. 3) extends transversely to the swivel shaft 19 and to the supporting rod 12 and is penetrated by the supporting rod 12. As illustrated in FIG. 1, this longitudinal recess 33 continues into a recess 34 of the same type in the lower cushion enlargement 15 which reaches to the lower edge of the head cushion 11 and expands in a wedge-shaped manner.

The above statements concerning the construction and the method of operation of the side piece 16 apply identically to the side piece 17 which, by way of the tube section 18 is connected in the same manner on the supporting rod 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A headrest for a vehicle seat having a backrest, comprising a head cushion fastened on two supporting rods for holding the head cushion on the backrest and having two side pieces which are assigned to the head cushion and which, in the in-use position, protrude laterally on the head cushion beyond a cushion front and, in the not-in-use position, are accommodated within the contour of the head cushion, wherein each side piece is swivellably disposed on a vertical tube section which, in turn, is fastened on a supporting rod to be swivellable about a swivel shaft extending transversely thereto, wherein the two vertical tube sections, which are in each case assigned to one side piece, are fixedly connected with one another by way of an upper and a lower cross traverse, said upper and lower cross transverse carry an upper and a lower cushion enlargement of the head cushion, respectively, wherein the side pieces each have a parallelepiped-shaped basic cushion body respectively situated between the cushion enlargements, said basic body has a depth which corresponds to the depth of the cushion enlargements, and has a padded wedge piece, and wherein the wedge pieces are constructed such that, in the not-in-use position of the side pieces, they cover one another at least partially in a direction transverse to a plane of the headrest which supports a user's head, between the cushion enlargements, and end approximately flush with the front and rear side of the cushion enlargements.

2. The headrest according to claim 1, wherein the vertical height of the side pieces is slightly lower than the distance between the upper and the lower cushion enlargement and is approximately half as large as the head cushion height.

3. The headrest according to claim 1, wherein the cushion enlargements are clipped onto a respective assigned cross traverse.

4. The headrest according to claim 1, wherein each of said tube sections is gripped in the center by a clamping hub which is swivellably held on a supporting arm which is fastened by the supporting rod and projects from it tangentially.

5. The headrest according to claim 4, wherein a bearing bush is arranged on the tube section above and below the clamping hub, wherein the bearing bushes carry a hollow cylinder surrounding the tube section and the supporting rod and, further comprising a disk cover molded-on bearing bush in one piece and closing end face of the hollow cylinder and wherein the basic body of the side piece is fixedly disposed on the hollow cylinder.

6. headrest according to claim 5, wherein the bearing bushes extend to the clamping hub.

7. The headrest according to claim 5, wherein, between an upper bearing bush and an upper cross traverse, which reaches around the tube section on the end side, a distance piece with a molded-on bearing disk is arranged which rests on the upper bearing bush cover, wherein a curved-segment-shaped slot which is concentric with respect to the tube section is arranged in the upper bearing bush cover and a pin is arranged on the bearing disk which projects into the slot or vice versa, and wherein the slot length is dimensioned such that the pin, in the not-in-use position of the side pieces, strikes against the one end and, in the in-use position of the side pieces, strikes against the other end of the slot.

8. The headrest according to claim 1, wherein the lower cross traverse, having end sides thereof, is pushed onto said tube section and is supported by way of a distance ring on the lower bearing bush, said tube section being held by a screw on the tube section, said screw being screwed into an internal thread cut in at the end of the tube section.

9. The headrest according to claim 5, wherein a longitudinal recess is provided in the lower bearing bush cover which extends at a right angle to the swivel shaft of the clamping hub, is penetrated by the supporting rod, and continues into a recess in the lower cushion enlargement which extends to the lower edge of the head cushion.

10. The headrest according to claim 2, wherein the cushion enlargements are clipped onto a respective assigned cross traverse.

11. The headrest according to claim 10, wherein each of said tube sections is gripped in the center by a clamping hub which is swivellably held on a supporting arm which is fastened by the supporting rod and projects from it tangentially.

12. The headrest according to claim 11, wherein a bearing bush is arranged on the tube section above and below the clamping hub, wherein the bearing bushes carry a hollow cylinder surrounding the tube section and the supporting rod and, further comprising a disk-shaped cover molded-on bearing bush in one piece, and closing end faces of the hollow cylinder, and wherein the basic body of the side piece is fixedly disposed on the hollow cylinder.

13. The headrest according to claim 12, wherein the bearing bushes extend to the clamping hub.

14. The headrest according to claim 13, wherein, between an upper bearing bush and an upper cross traverse, which reaches around the tube section on the end side, a distance piece with a molded-on bearing disk is arranged which rests on the upper bearing bush cover, wherein a curved-segment-shaped slot which is concentric with respect to the tube section is arranged in the upper bearing bush cover and a pin is arranged on the bearing disk which projects into the slot or vice versa, and wherein the slot length is dimensioned such that the pin, in the not-in-use position of the side pieces, strikes against the one end and, in the in-use position of the side pieces, strikes against the other end of the slot.

15. The headrest according to claim 14, wherein the lower cross traverse, having end sides, is pushed onto said tube sections respectively, is supported by way of a distance ring on the lower bearing bush, and is held by means of a screw on the tube section which is screwed into an internal thread cut in at the end of the tube section.

16. The headrest according to claim 15, wherein a longitudinal recess is provided in the lower bearing bush cover which extends at a right angle to the swivel shaft of the clamping hub, is penetrated by the supporting rod, and continues into a recess in the lower cushion enlargement which extends to the lower edge of the head cushion.

17. A headrest for a vehicle seat having a backrest, comprising:

an upper cushion part, a lower cushion part, and a pair of side piece cushion parts disposed intermediate the upper and lower cushion parts to be pivotally movable between a non-use position partially overlapping one another in a direction transverse to a plane of the headrest which supports a user's head and inside a contour defined between the upper and lower cushion parts, and an in-use position protruding forwardly of the upper and lower cushion parts at respective sides thereof to form lateral head cushioning parts.

18. The headrest according to claim 17, comprising a pair of supporting rods supporting said cushion parts at a vehicle set back rest.

19. The headrest according to claim 18, comprising:

a pair of vertical tube sections connecting the upper and lower cushion parts with one another, wherein said tube sections are supported at said respective supporting rods for pivotal tilting movement of the head rest cushions.

20. The headrest according to claim 19, wherein said side piece cushion parts are pivotally supported at respective ones of said vertical tube sections.

* * * * *